United States Patent [19]

Oudot et al.

[11] 4,073,113
[45] Feb. 14, 1978

[54] BUILDING FRAME

[75] Inventors: Pierre Armand Oudot, Chatenay-Malabry; Leon Petroff, Epinay-sur-Seine, both of France

[73] Assignees: Profiles et Tubes de l-Est, Beuilly-sur-Seine; Centre de Recherche d'Architecture d'Urbanisme et de Construction Rauc, Paris, both of France

[21] Appl. No.: 605,608

[22] Filed: Aug. 18, 1975

[51] Int. Cl.² ............................ E04C 5/16; E04B 1/38
[52] U.S. Cl. ........................................ 52/710; 403/189
[58] Field of Search .............. 182/178, 179; 52/758 C, 52/758 F, 731, 655, 710, 238, 637, 638; 85/32; 403/189

[56] References Cited

U.S. PATENT DOCUMENTS

| | | | |
|---|---|---|---|
| 1,698,849 | 1/1929 | Leisy | 52/655 |
| 2,345,650 | 4/1944 | Attwood | 52/710 |
| 2,380,379 | 7/1945 | Attwood | 52/710 |
| 2,784,812 | 3/1957 | Kindorf | 52/710 |
| 3,429,601 | 2/1969 | Bremers | 52/758 F |

FOREIGN PATENT DOCUMENTS

| | | | |
|---|---|---|---|
| 1,512,833 | 1/1968 | France | 52/731 |
| 570,589 | 12/1957 | Italy | 52/238 |
| 853,429 | 11/1960 | United Kingdom | 52/758 C |

OTHER PUBLICATIONS

Unistrut Publication, Catalogue No. 5, dated March 2, 1961, pp. 1–3.

*Primary Examiner*—James L. Ridgill, Jr.
*Attorney, Agent, or Firm*—Richard L. Johnston

[57] ABSTRACT

Building frame elongate structural elements are provided having at least one cavity which in transverse cross section has a mouth permitting access to said cavity, defined by a pair of opposed flanges which have first portions extending toward each other across the mouth and second portions extending inwardly of the cavity from said first portions and terminating at free edges so as to leave to each side of the mouth an undercut space which is behind the first portion and laterally outside the second portion, the said second portions of the flanges being deformable. Fixing members for combining said structural elements are also provided. The fixing members and structural elements are useful in making building frames from a plurality of the structural elements.

10 Claims, 17 Drawing Figures

FIG.1
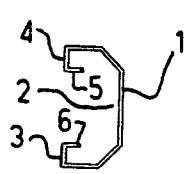
FIG.3
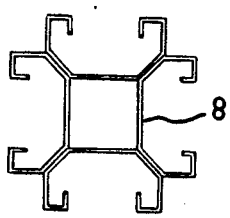
FIG.2
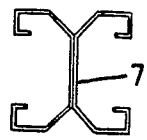
FIG.5
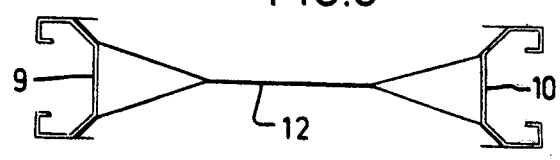
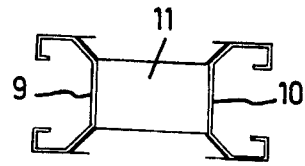
FIG.4
FIG.6
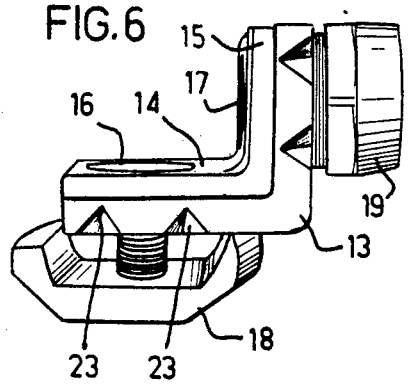
FIG.13
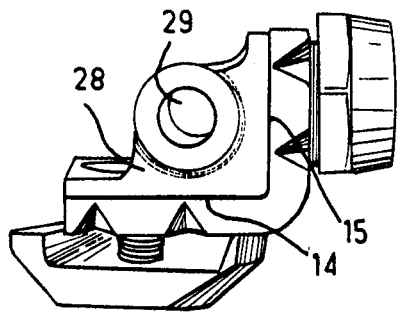

BUILDING FRAME

This invention relates to building frame structural elements and fixing members therefor, and to building frames including the structural elements secured by the fixing members.

According to the invention in one aspect there is provided a building frame elongate structural element having at least one cavity which as seen in transverse section has a mouth permitting access to the cavity, defined by a pair of opposed flanges which have first portions extending towards each other across the mouth and second portions extending inwardly of the cavity from said first portions and terminating at free edges so as to leave to each side of the mouth an undercut space which is behind the first portion and laterally outside the second portion at that side, the said second portions of the flanges being deformable. Preferably the structural element is of profiled steel. It may be thin and light and yet of sufficient strength.

According to the invention in another aspect there is provided a fixing member for the structural element of the invention as described above, said member having a body and a cap which has opposite end portions directed towards the body with respect to a central portion, the cap in a first position being insertable into the said cavity of the structural element and being rotatable after insertion from said first position to a second position in which said end portions lie behind said flanges of the structural element, and the fixing member further having means to urge together the body and the cap when the cap is in the second position so as to clamp said flanges, and the body and the cap being so shaped, as to deform at least one of said flanges during the clamping thereby securing the fixing member to the structural element in a manner inhibiting slippage along the structural element.

The body of the fixing member preferably has two said caps which are rotatable from their first positions to their second positions about respective axes which are at a right angle to each other. Suitably at least the body of the fixing member is a cast part.

The invention further provides a combination of at least one structural element of the invention with at least one fixing member of the invention, either assembled together or otherwise.

Also according to the invention there is provided a building frame having a plurality of the structural elements of the invention secured together by the fixing members of the invention.

Embodiments of the invention will now be described by way of example with reference to the accompanying drawings, in which:

FIG. 1 shows in end view a simple profiled structural element embodying the invention having a C-shaped throat;

FIGS. 2 to 5 are respective end views of various profiled structural elements embodying the invention obtained by direct or indirect assembly of simple profiled elements as shown in FIG. 1;

FIG. 6 is a side view of a fixing member embodying the invention;

FIG. 13 is a perspective of a second fixing member embodying the invention, used for bracing;

A simple elongate profiled steel structural element is shown in FIG. 1. It has a cavity or throat 2, which, in transverse section, has the shape of a C whose facing extremities are made up of two flanges having first portions 3, 4 directed towards each other and mutually parallel second portions 5, 6 at 90° to the first portions. The second portions are parallel and directed towards the inside of the throat, where they terminate at free edges. These two flanges define between them the opening or mouth of the throat and it can be seen that an undercut space is provided behind the first portions 3, 4. The second portions are deformable as discussed below.

The profiled structural elements within the scope of the present invention include simple profiled elements such as shown in FIG. 1 and complex profiled elements obtained by direct or indirect assembly of these simple elements. FIGS. 2 and 3 respectively show profiled elements 7 and 8 obtained by the assembly of two and four simple profiled elements. Profiled elements such as those in FIGS. 1, 2 and 3 are especially intended for use as frame uprights, and therefore have longitudinally extending throats.

Figure 14:
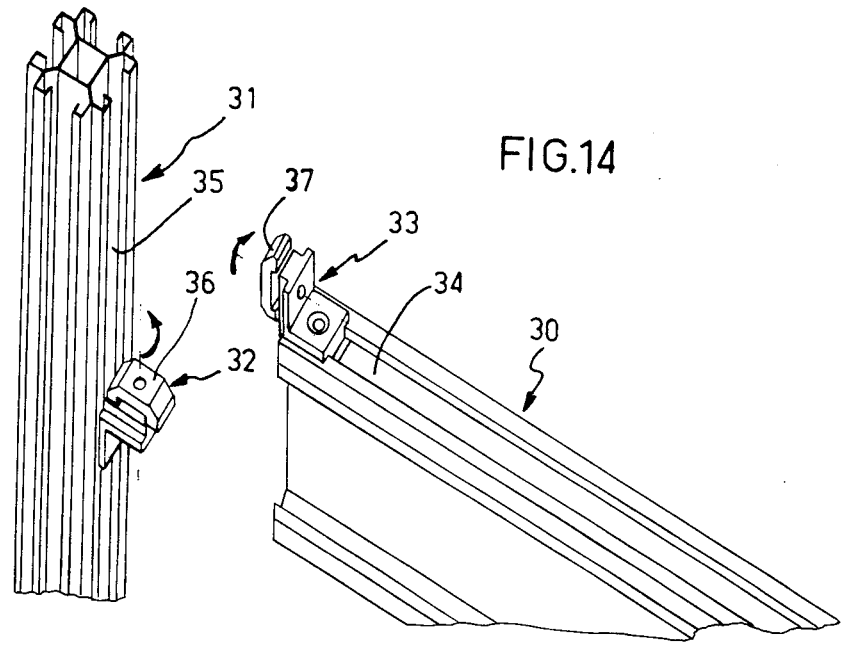
FIG. 14 illustrates a mode of assembly of two structural elements embodying the invention by means of two fixing members embodying the invention.
Figure 15:
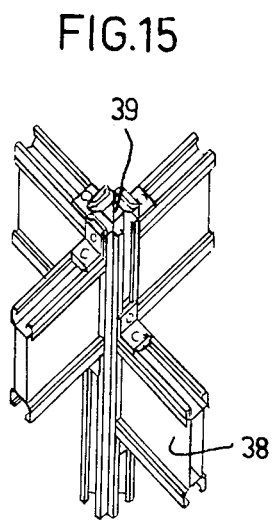
FIGS. 15 and 16 are perspectives showing two assemblies embodying the invention.
Figure 16:
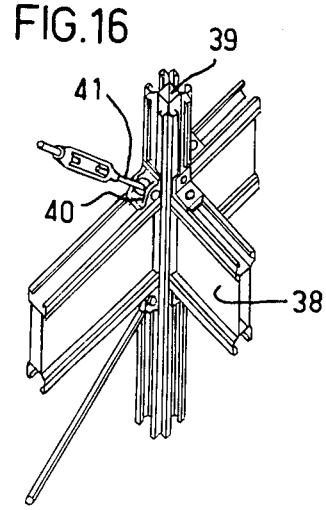

FIGS. 4 and 5 show indirect assemblies of simple profiled elements. In FIG. 4, two simple profiled elements 9 and 10 are secured by welding to a rectangular intermediate core 11 (which as shown in FIGS. 14 to 16 may be two plane sheets) while in FIG. 5 the two simple profiled elements 9 and 10 are secured by welding to an X-shaped intermediate core 12. Profiled elements such as shown in FIGS. 4 and 5 are especially intended for use as frame girders. These girders are thus furnished at each end with a transverse throat. The invention is not however limited to a particular shape of core between the simple elements and shapes such as 11 and 12 are given only by way of preferred examples.

FIG. 6 is a view of a typical fixing part embodying the present invention. This part is made up of body 13 having two legs 14, 15 at a right-angle, each leg 14, 15 having an aperture 16, 17 and receiving on its external face a cap 18, 19 which has a screw-threaded aperture for the passage of a bolt 20 which passes also through the aperture 16, 17 in the body. Caps 18, 19 are C-shaped and have dimensions so that in one position (FIGS. 7 and 8) the cap, in this case the cap 18, can be inserted at any desired place in the throat 2 of a profiled element 1 and, after rotation through about 90° relative to its position of introduction into the throat, can be caused to come into abutment by the tightening of the bolt 20, with the first portions 3, 4 of the flanges of the structural element, clamping them directly against the body 13 after having caused a progressive deformation of the second portions 5, 6 of the throat. By deformation of the flanges, the fixing member is secured in a positive manner, i.e. slippage along the structural member can be for practical purposes prevented.

In order to obtain this deformation, the outer surfaces of the body 13 against which the cap 18 is held has two reaction points 21, 22 for the first portions 3, 4 and has surfaces 23, 24 adapted to co-operate with corresponding surfaces 25, 26 of the cap 18 to make up jaws adapted to cause the deformation of the flanges during tightening of the bolt 20. The surfaces acting to cause the deformation are for example pairs of complementary V surfaces as best seen in FIG. 6, which shows two surfaces 23 which the leg 14 of the body 13 has on one side. The opposite side of the body 13 is provided with two similar surfaces 24. The cap 18 has raised surfaces corresponding in shape to that of the relieved surfaces 23 on the leg of the body. The other leg of the body 13 co-operates in like fashion with the other cap 19. The caps 18, 19 thus constitute gripping clamps.

Various stages in the positioning of a fixing member on a profiled element are shown in FIGS. 7 to 12.

Figure 7:
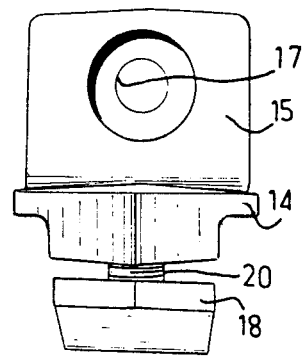
FIGS. 7, 9 and 11 are side views showing the fixing member of FIG. 6 in various stages during its attachment in the throat of the structural element of FIG. 1.
Figure 8:
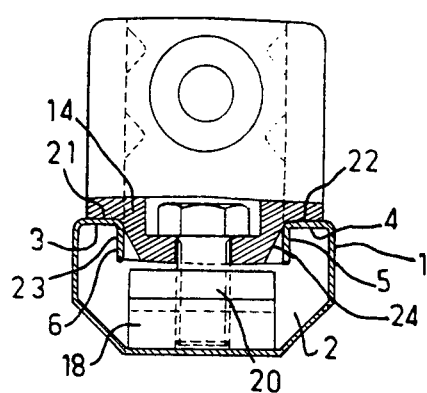
FIGS. 8, 10 and 12 are sectional views transversely of the structural element showing stages in the attachment of the fixing member of FIG. 6, correspondingly respectively to the positions of FIGS. 7, 9, and 11.
Figure 9:
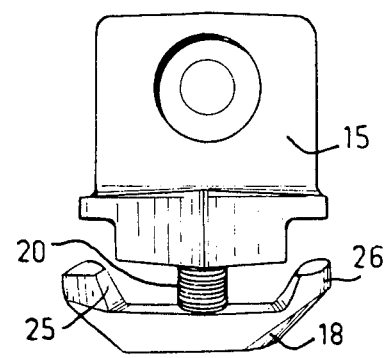
Figure 10:
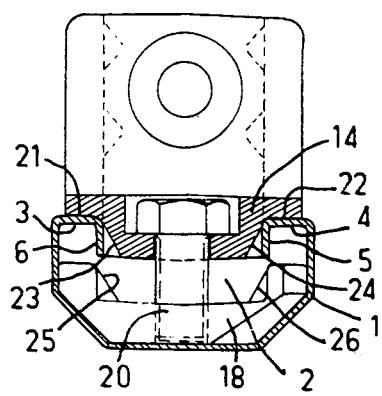
Figure 11:
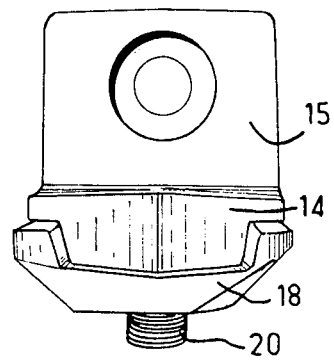
Figure 12:
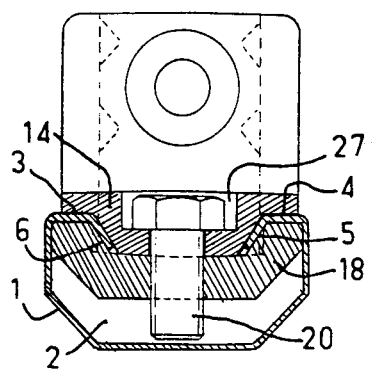

In FIGS. 7 and 8, the cap 18 is in its first position ready for introduction into the throat 2 of a profiled element 1. It can be seen that the width of the cap is smaller than the gap between the flanges 5 and 6 of the throat, which allows the cap to enter right into the throat. In FIGS. 9 and 10, the cap 18 has been turned through 90° relative to its position when introduced and, in this second position, is in the bottom of the throat, substantially conforming to the shape of this bottom. In FIGS. 11 and 12, is shown the final assembly position in which the cap has been brought towards and tightened onto the leg of the body 13 by means of the bolt 20, thus clamping and deforming the second portions 5, 6.

In the example given, the head of the bolt 20 is housed in a suitable recessed portion 27 of the leg 14 of the body 13. The cap 18 is like a nut for the bolt captured in the throat. In a variant, the bolt could in effect be provided with a nut which would be held in a housing in the cap and which would be constrained against rotation in that housing. Of course, the bolt can be replaced by any element capable of fulfilling the same function of urging together the elements 14 and 18.

FIG. 13 shows a particular form of body 13 of the fixing member in which the legs 14 and 15 are complemented by a leg 28 which is orthogonal to the legs 14 and 15 and which is provided with means for fixing a bracing link or strainer. In the example given, this means for fixing is made up of one or more apertures 29 which can receive bolts or pins for the mounting of the end of a strainer or link.

To mount a girder 30 on an upright 31 (FIG. 14), the girder being for example of the type shown in FIG. 5 and the upright for example of the type shown in FIG. 3, the following method can be used:

A fixing member 32 is placed in the throat 35 of the upright 31 at the desired place for positioning the lower edge of the girder. Another fixing member 33 is placed in the upper throat 34 of the girder 30. The girder is brought up to the upright until the same moment the upper cap 36 of the fixing member 32 comes into the lower throat of the girder and the front cap 37 of the fixing member 33 comes into the throat 35 of the upright 31. All that needs to be done then is to ensure assembly by tightening the two caps.

FIG. 15 is a part view showing the mounting of several girders 38 of the type shown in FIG. 4 on an upright 39 of the type shown in FIG. 3.

FIG. 16 shows a modified mounting in which certain of the fixing members used, such as fixing member 40, are staying fixing members of the type shown in FIG. 13. The end of a strainer 41 can be seen fixed to this fixing member 40.

Figure 17:
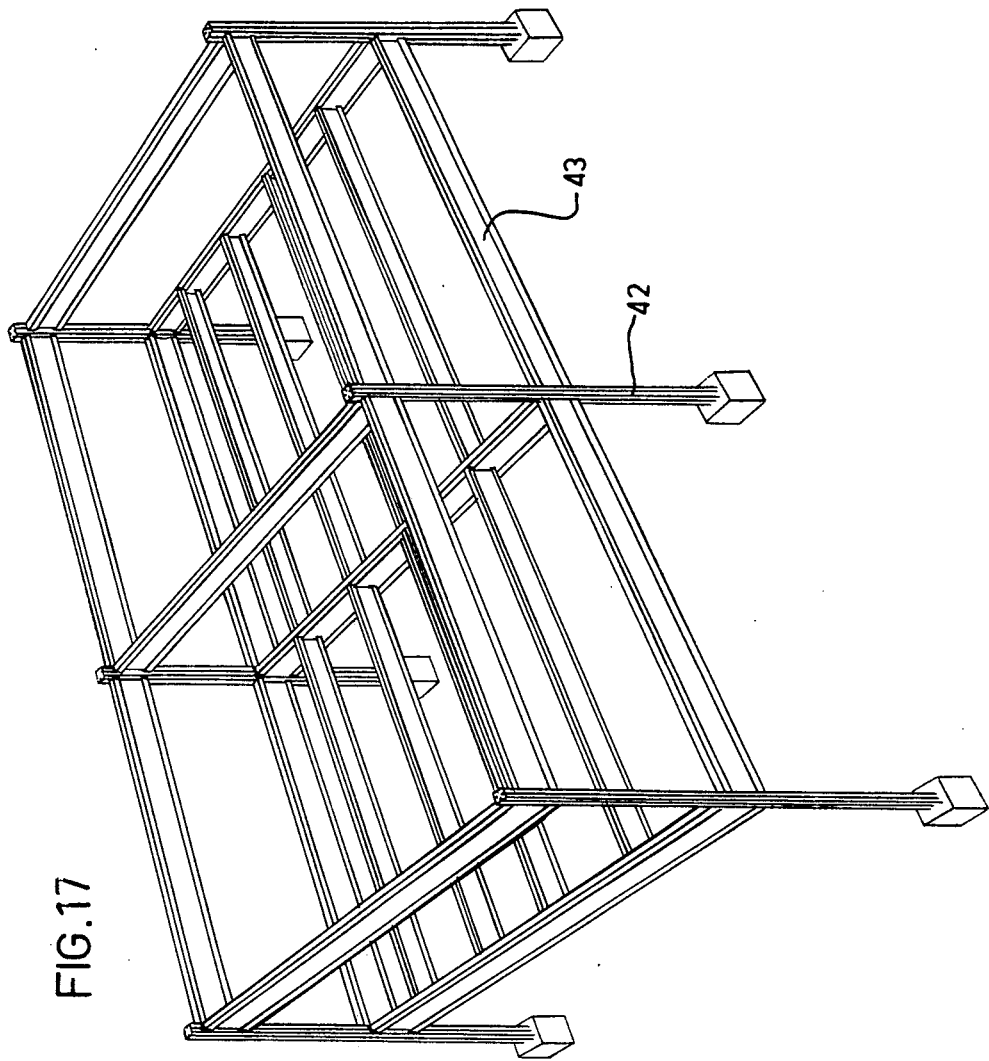
FIG. 17 is a diagrammatic view of a frame of a building embodying the present invention.

Finally, FIG. 17 is a standard diagram, given solely by way of example, of a single-level frame made up of uprights 42 and girders 43 of the present invention assembled by means of fixing devices of the present invention. What we claim is:

1. A fixing member for a building frame elongate structural element having at least one cavity which as seen in transverse section has a mouth permitting access to the cavity, defined by a pair of opposed flanges which have first portions extending towards each other across the mouth and second portions extending inwardly of the cavity from said first portions and terminating at free edges so as to leave to each side of the mouth an undercut space which is behind the first portion and laterally outside the second portion at that side, the second portions of the flanges being deformable by bending laterally, said fixing member having a body and a cap which has opposite end portions directed towards the body with respect to a central portion, the cap in a first position being insertable into the said cavity of the structural element and being rotatable after insertion from said first position to a second position in which said end portions lie behind said flanges of the structural element, and the fixing member further having means to urge together the body and the cap when the cap is in the second position so as to clamp said flanges, and the body and the cap being so shaped, as to deform at least one of said flanges by bending laterally during the clamping thereby securing the fixing member to the structural element in a manner inhibiting slippage along the structural element.

2. A fixing member as claimed in claim 1 wherein the cap and body have at least one V-shaped notch and complementary recess adapted to cause deformation of the flange or flanges.

3. In combination, a building frame elongate structural element having at least one cavity which as seen in transverse section has a mouth permitting access to the cavity, defined by a pair of opposed flanges which have first portions extending towards each other across the mouth and second portions extending inwardly of the cavity from said first portions and terminating at free edges so as to leave to each side of the mouth an undercut space which is behind the first portion and laterally outside the second portion at that side, the said second portions of the flanges being deformable by bending laterally, and a fixing member having a body and a cap which has opposite end portions directed towards the body with respect to a central portion, the cap in a first position being insertable into the said cavity of the structural element and being rotatable after insertion from said first position to a second position in which said end portions lie behind said flanges of the structural element, and the fixing member further having means to urge together the body and the cap when the cap is in the second position so as to clamp said flanges, and the body and the cap being so shaped, as to deform at least one of said flanges by bending laterally during the clamping thereby securing the fixing member to the structural element in a manner inhibiting slippage along the structural element.

4. A combination as claimed in claim 3 wherein said first portions of the flanges are coplanar and the said second portions are mutually parallel and are at 90° to the first portions.

5. A combination as claimed in claim 3 wherein said structural element is made of profiled steel.

6. A combination as claimed in claim 3 wherein the body and cap each have an aperture receiving a bolt constituting the said urging means.

7. A combination as claimed in claim 3 wherein the body has two said caps which are rotatable from their first positions to their second positions about respective axes which are at a right angle to each other.

8. A combination as claimed in claim 3 wherein the cap and body have at least one V-shaped notch and complementary recess adapted to cause said deformation of the flange or flanges.

9. A combination as claimed in claim 3 wherein said structural element is comprised of two or more unitary parts each having a said cavity, the parts being connected directly to each other or through an intermediate member or members, the mouths of the respective cavities facing in different directions.

10. A combination as claimed in claim 9 wherein the said unitary parts are connected through an intermediate connection which is rectangular or is generally X-shaped in transverse section.

* * * * *